United States Patent [19]

Hossack et al.

[11] Patent Number: 5,678,554
[45] Date of Patent: Oct. 21, 1997

[54] ULTRASOUND TRANSDUCER FOR MULTIPLE FOCUSING AND METHOD FOR MANUFACTURE THEREOF

[75] Inventors: John Hossack, Palo Alto; Christopher R. Cole, Cupertino; Jian-Hua Mo, Milpitas, all of Calif.

[73] Assignee: Acuson Corporation, Mountain View, Calif.

[21] Appl. No.: 675,412

[22] Filed: Jul. 2, 1996

[51] Int. Cl.$^6$ ..................................... A61B 8/00
[52] U.S. Cl. ..................................... 128/662.03
[58] Field of Search ............ 128/663.01, 660.06, 128/660.07, 661.01, 662.03; 73/625, 626, 642; 310/334, 335, 365, 366, 367, 320

[56] References Cited

U.S. PATENT DOCUMENTS

| | | |
|---|---|---|
| 3,953,825 | 4/1976 | Kino et al. . |
| 4,016,750 | 4/1977 | Green . |
| 4,016,751 | 4/1977 | Kossoff . |
| 4,140,022 | 2/1979 | Maslak . |
| 4,350,917 | 9/1982 | Lizzi et al. . |
| 4,395,912 | 8/1983 | Hassler . |
| 4,403,311 | 9/1983 | Tournois . |
| 4,403,314 | 9/1983 | Tournois . |
| 4,446,740 | 5/1984 | Wilson et al. ............... 128/660.06 |
| 4,456,982 | 6/1984 | Tournois . |
| 4,458,342 | 7/1984 | Tournois . |
| 4,534,221 | 8/1985 | Fife et al. ............... 73/626 |
| 4,550,607 | 11/1985 | Maslak et al. . |
| 4,699,009 | 10/1987 | Maslak et al. . |
| 4,870,871 | 10/1989 | Russell et al. . |
| 4,974,558 | 12/1990 | Katakura et al. . |
| 5,014,712 | 5/1991 | O'Donnell . |
| 5,105,814 | 4/1992 | Drukarey et al. . |
| 5,113,706 | 5/1992 | Pittaro . |
| 5,142,649 | 8/1992 | O'Donnell . |
| 5,218,869 | 6/1993 | Pummer . |
| 5,228,007 | 7/1993 | Murakami et al. . |
| 5,235,982 | 8/1993 | O'Donnell . |
| 5,301,674 | 4/1994 | Erikson et al. . |
| 5,305,756 | 4/1994 | Entrekin et al. . |
| 5,322,068 | 6/1994 | Thiele et al. . |
| 5,415,175 | 5/1995 | Hanafy et al. . |
| 5,417,219 | 5/1995 | Takamizawa et al. . |
| 5,438,998 | 8/1995 | Hanafy ............... 128/662.03 |
| 5,546,946 | 8/1996 | Souquet ............... 128/662.03 |
| 5,565,628 | 10/1996 | Lorraine ............... 73/642 |

OTHER PUBLICATIONS

Entrekin, R., et al., "Real–time 3–D Ultrasound Imaging With a 1–D Fan Beam Transducer Array," pp. 264–271, SPIE vol. 1733 (1992).

Devonald, K., et al., "Volume Imaging: Three–Dimensional Appreciation of the Fetal Head and Face," pp. 919–925, J. Ultrasound Med. (1995).

Tournois, P., "Acoustical Imaging Via Coherent Reception of Spatially Coloured Transmissions," Ultrasonics Symposium, pp. 747–750 (1980).

Hernandez, J. et al., "Synthesis of the Driving Functions of an Array for Propagating Localized Wave Energy," J. Acoust. Soc. Am. 92(1), pp. 550–562, Jul. 1992.

Schrope B. et al., "Simulated Capillary Blood Flow Measurement Using a Nonlinear Ultrasonic Contrast Agent," Ultrasonic Imaging 14, pp. 134–158 (1992).

Jian–Yu Lu et al., "Ultrasonic Nondiffracting Transducer for Medical Imaging," IEEE Transactions on Ultrasonics, Ferroelectrics, and Frequency Control, vol. 37, No. 5, Sep. 1990.

*Primary Examiner*—George Manuel
*Attorney, Agent, or Firm*—Brinks Hofer Gilson & Lione

[57] ABSTRACT

An ultrasound transducer having an elevation profile or surface geometry for focusing various frequency ultrasound beams at various focal points. The elevation profile or surface geometry is defined by at least two different geometries.

33 Claims, 8 Drawing Sheets

THICKNESS ACROSS ELEVATION FOR FIXED 90mm FOCUS

FIG. 6

CENTER FREQUENCY VARIATION ACROSS ELEVATION

FIG. 7

FIXED FOCUS AT 90mm-SLIDING FILTER

FIG. 8

MULTIPLE FOCUS 40-140mm-SLIDING FILTER

SCALE CROSS-SECTION OF ELEVATION STEERED ARRAY

FIG.12

PRESSURE IMPULSE RESPONSE AT THICK AND THIN ENDS OF ELEVATION

FIG.13 PRESSURE OUTPUT FROM THIN(-) AND THICK(--) ENDS FOR 2 MHz, 80% BW EXCITATION

FIG.14 PRESSURE OUTPUT FROM THIN(-) AND THICK(--) ENDS FOR 4 MHz, 40% BW EXCITATION

ULTRASOUND TRANSDUCER FOR MULTIPLE FOCUSING AND METHOD FOR MANUFACTURE THEREOF

FIELD OF THE INVENTION

This invention relates to transducers and more particularly to an ultrasound transducer for use in the medical diagnostic field that provides multiple focusing.

Ultrasound machines are often used for observing organs in the human body. Typically, these machines incorporate transducer arrays for converting electrical signals into pressure waves and vice versa. Generally, the transducer array is in the form of a hand-held probe which may be adjusted in position while contacting the body to direct the ultrasound beam to the region of interest. Transducer arrays may have, for example, 128 phased transducer segments or elements for generating a steerable ultrasound beam in order to image a sector slice of the body.

Electrical contact is made to the front and rear portion of each transducer element for individually exciting and receiving from each element. The pressure waves generated by the transducer elements are directed toward the object to be observed, such as the heart of a patient being examined. The steering of the beam in the plane of electronic scanning, i.e., the image plane, is done in real time by computer generated time delays. Each time a pressure wave confronts a tissue interface having different acoustic impedance characteristics, a wave is reflected backward. The phased array of transducer segments may then likewise convert the reflected pressure waves into corresponding electrical signals. An example of a phased array acoustic imaging system is described in U.S. Pat. No. 4,550,607 granted Nov. 5, 1985 to Maslak et al. and is incorporated herein by reference. That patent illustrates circuitry for focusing the incoming signals received by the transducer array in order to produce an image on the display screen.

Broadband transducers are transducers capable of operating over a wide range of frequencies without a loss in sensitivity. It is well recognized that the absorption characteristics of the body being imaged can have a significant impact on the operation of an ultrasonic imaging system. For example, the ultrasonic absorption coefficient of living tissue increases with frequency, and lower frequencies are therefore preferred for imaging at greater depths. Higher frequencies provide improved resolution in the range dimension than lower frequencies, and higher frequencies are preferred for imaging at shallower depths.

The elevation focusing of most phased array transducers can generally be categorized as lens focused or mechanically focused. In the case of lens focused transducer arrays the emitting surface of the array is flat in the elevation direction and a shaped material, the lens material, is placed between the object to be imaged and the array. The lens material has a different velocity of sound than the object being imaged. The elevational focusing of the ultrasound beam is achieved through refraction at the lens/object interface. U.S. Pat. Nos. 4,686,408 and 5,163,436 describe lens focused phased array transducers and are specifically incorporated herein by reference. The material used to form the lens is typically silicone based and, unfortunately, also has the undesirable property of absorbing or attenuating passing ultrasound energy and thereby reducing the overall sensitivity of the transducer array.

Mechanically focused transducer arrays utilize a piezoelectric layer which has a curved surface geometry which faces the object to be imaged. The surface is curved along the elevation direction and forms either a concave or convex structure. U.S. Pat. Nos. 5,415,175 and 5,438,998 describe such mechanically focussed transducer arrays and are hereby specifically incorporated by reference. The design of the transducer elements described in these two patents allow the operator to control which section of the transducer element generates the ultrasound beam. At high frequencies the exiting beam width is generated from the center of the transducer element and thus has a narrow aperture. At low excitation frequencies the exiting beam width is generated from the full aperture of the transducer elements and thus has a wider aperture. Because the surface geometry of the transducer elements described in these two patents is defined by a circular arc, only one single focal point results.

It is thus desirable to provide an ultrasound transducer whose focal depth can be varied by varying the frequency component applied to the transducer elements. It is also desirable to provide an ultrasound transducer whose focal depth can be varied by varying the frequency component applied to the transducer elements in conjunction with a time-varying filter to filter different frequency components in a time-varying manner during reception.

It is also desirable to provide a simple, inexpensive method for making and using an ultrasonic array which may be steered in the elevation direction such that improved 3D volumetric type reconstructions may be obtained.

The simplest method for producing a 3D type volume image is to use a full 2D array steered in 2 orthogonal directions. In practice this has proven to be virtually impossible. The 2D array method is complex in terms of the array fabrication, electrical matching and noise issues and system processing in real time.

U.S. Pat. No. 5,305,756 disclosed that for solid bodies surrounded by fluid, for example, a fetus, a very good quasi 3D image may be obtained by using a divergent elevation beam lens. This works by integrating the beam in the elevation direction which, while contrary to normally desired practice, actually works well. This method is limited in its scope because it merely uses straightforward integration in the elevation direction.

SUMMARY OF THE INVENTION

According to a first aspect of the present invention there is provided a transducer for producing an ultrasound beam upon excitation having a plurality of transducer elements, each of the transducer elements having a surface facing a region of examination wherein the surface has a shape that can focus a beam at more than one focal point.

According to a second aspect of the present invention there is provided an ultrasound transducer having a plurality of transducer elements where each transducer element having a front surface facing a region of examination, a back surface, two side portions and a thickness between the front portion and the back portion. The thickness is greater at each of the side portions than between the side portions. The front surface is generally non-planar wherein each of the transducer elements produce an ultrasound beam that is focused at a first focal point when a first frequency is used to excite the transducer elements and a second focal point for a second frequency, the second focal point being different from the first focal point.

According to a third aspect of the present invention, there is provided an ultrasound system for generating an image, having transmit circuitry for transmitting electrical signals to a transducer probe, a transducer probe for transmitting an ultrasound beam produced by a given frequency excitation and for receiving pressure waves reflected from a body being examined, and receive circuitry for processing the signals received by the transducer probe. The transducer probe includes a plurality of transducer elements, each of the transducer elements having a surface facing a region of examination wherein the surface has a shape that can focus a beam at more than one focal point.

According to a fourth aspect of the present invention there is provided an ultrasound system for generating an image including transmit circuitry for transmitting electrical signals to a transducer probe, a transducer probe for transmitting an ultrasound beam produced by a given frequency excitation and for receiving pressure waves reflected from a body being examined, and receive circuitry for processing the signals received by the transducer probe. The transducer probe includes a plurality of transducer elements, each transducer element having a front surface facing a region of examination, a back surface, two side portions and a thickness between the front portion and the back portion. The thickness is greater at each of the side portions than between the side portions. The front surface is generally non-planar wherein each of the transducer elements produces an ultrasound beam that is focused at a first focal point when a first frequency is used to excite the transducer elements and a second focal point for a second frequency, where the second focal point is different from the first focal point.

According to a fifth aspect of the present invention there is provided a method of making a transducer for producing an ultrasound beam upon excitation. The method includes the steps of forming a plurality of transducer elements, each of the transducer elements having a front surface facing a region of examination, a back surface, two side portions and a thickness between the front portion and the back portion. The thickness is greater at each of the side portions than between the side portions and the front surface being generally non-planar. Each of the transducer elements produces an ultrasound beam that is focused at a first focal point when a first frequency is used to excite the transducer elements and a second focal point for a second frequency, where the second focal point is different from the first focal point. The method further includes establishing an electric field through at least one portion of each transducer element.

According to a sixth aspect of the present invention there is provided a method of making a transducer for producing an ultrasound beam upon excitation. The method includes the steps of forming a plurality of transducer elements, each of the transducer elements having a surface facing a region of examination wherein the surface has a shape that can focus a beam at more than one focal point, and establishing an electric field through at least one portion of each transducer element.

According to a seventh aspect of the present invention there is provided a method for producing an image in response to excitation of a transducer for generating an ultrasound beam. The method includes the steps of providing electrical signals to a transducer probe for transmitting a beam of ultrasound pressure waves to an object being examined. The transducer probe includes a plurality of transducer elements, each of the transducer elements having a surface facing a region of examination wherein the surface has a shape that can focus a beam at more than one focal point. The method includes receiving pressure waves reflected from the object being examined and converting the received pressure waves into electrical signals, processing the received electrical signals and displaying the object being examined.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
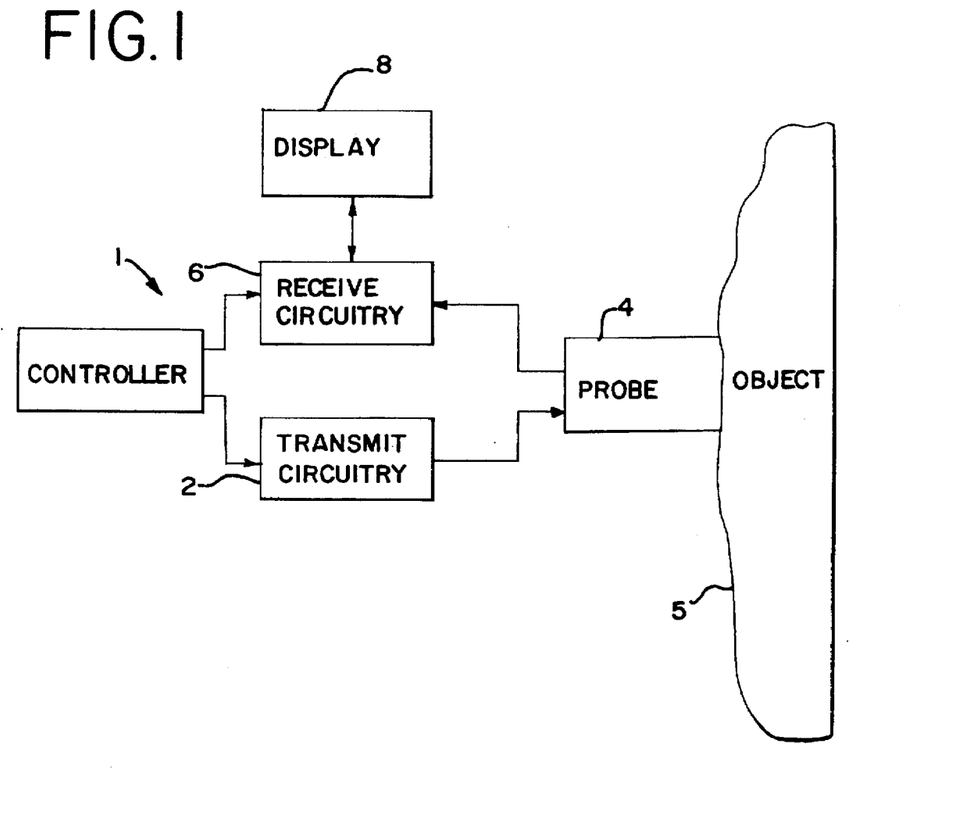
FIG. 1 is a block diagram of an ultrasound system for generating an image.

FIG. 1 is a block diagram of an ultrasound system 1 for generating an image of an object or body 5 being observed. The ultrasound system 1 has transmit circuitry 2 for transmitting electrical signals to the transducer probe 4, receive circuitry 6 for processing the signals received by the transducer probe 4, and a display 8 for providing the image of the object 5 being observed. Preferably, the probe 4 is hand-held and can be adjusted in position to direct the ultrasound beam to the region of interest. The probe 4 converts the electrical signals provided by the transmit circuitry 2 to pressure waves. The probe 4 also converts the pressure waves reflected from the object 5 being observed into corresponding electrical signals which are then processed in the receive circuitry 6 and ultimately displayed 8.

The transmit circuitry 2 includes a transmit beamformer controlled by a controller 15 which applies analog transmit voltage waveforms via a multichannel switch (not shown) to an array 10 of transducer elements 11 housed in the probe 4. (See FIG. 2). Various embodiments of transmit beamformers suitable for use in the system of FIG. 1 will be described hereinafter.

Figure 2:
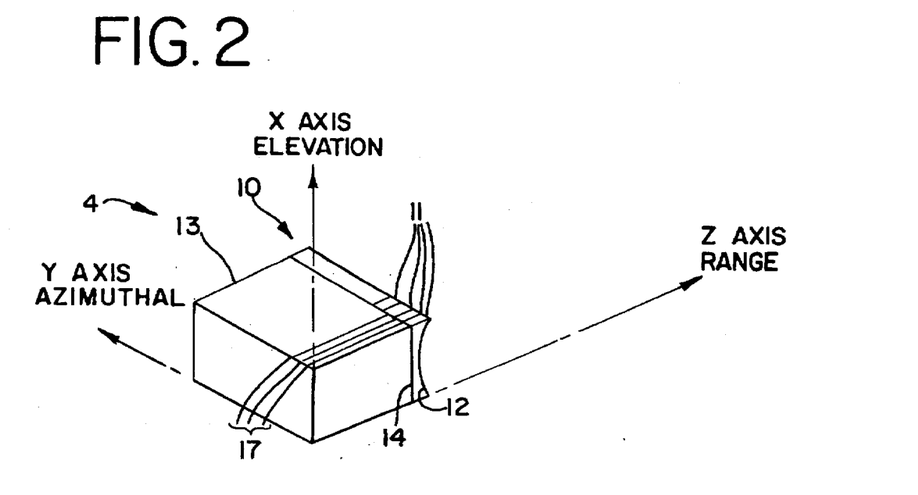
FIG. 2 is a perspective view of a broadband transducer array further illustrating the probe 4 of FIG. 1.

The transducer elements 11 each receive a respective transmit waveform and generate a respective ultrasonic transducer pressure waveform. Echos from body structures are detected by the transducer elements 11 which generate respective receive voltage waveforms. These receive waveforms are applied via the multichannel switch to a receive beamformer in the receive circuitry 6 which filters the received signal to help optimize the beam forming process by selectively emphasizing those frequencies of most interest and rejecting those frequencies containing less useful signal and/or noise. Suitable delays are also applied to the receive waveforms to create a coherent sum for selected points along the spatial axis.

In one mode of operation, the receive beamformer selects delays to focus at progressively longer ranges along a line of focus, thereby sampling multiple points along the line. In order to take advantage of the time-varying frequency distribution of ultrasonic energy along the line of focus, the receive beamformer preferably includes a time-varying filter that attenuates frequency components of the receive waveforms other than those characteristic of the focal range of interest. The operation of the time-varying bandpass filter will be described in greater detail hereinafter.

FIG. 2 is a perspective view of a broadband transducer array 10 further illustrating the probe of FIG. 1. To simplify and illustrate the relevant features of the probe not all of the components forming the probe have been shown. Referring to FIG. 2, the probe 4 contains an array 10 of transducer elements 11. Adapted from radar terminology, the indicated x, y and z directions are referred to as the azimuthal, elevation and range directions or axes, respectively. Typically, there are one hundred twenty eight elements 11 sequentially disposed along the y-azimuthal axis forming the broadband transducer array 10. The array may, however, consist of any number of transducer elements 11 each arranged in any desired geometrical configuration.

The transducer elements 11 are disposed on a support or backing block 13. The backing block 13 should be highly attenuative such that ultrasound energy radiated in its direction (i.e., away from an object of interest) is substantially absorbed. A matching layer or layers (not shown) may be disposed on the surface of the transducer elements that face the object to be examined. In addition, a mechanical lens (not shown) may be placed on the matching layer to help confine the generated beam in the elevation-range plane and focus the ultrasound energy to a clinically useful depth in the body. Preferably a low loss polyurethane non-focusing window can form the lens. Alternatively a focusing RTV silicone lens can be used to create a compound focusing system that is partly focused by the shape of the transducer element and partly focused by the RTV lens. The transducer array 10 may be placed in a nose piece (not shown) which houses the array. Examples of prior art transducer structures are disclosed in Charles S. DeSilets, *Transducer Arrays Suitable for Acoustic Imaging*, Ph.D. Thesis, Stanford University (1978) and Alan R. Selfridge, *Design and Fabrication of Ultrasonic Transducers and Transducer Arrays*, Ph.D. Thesis, Stanford University (1982).

Figure 3:
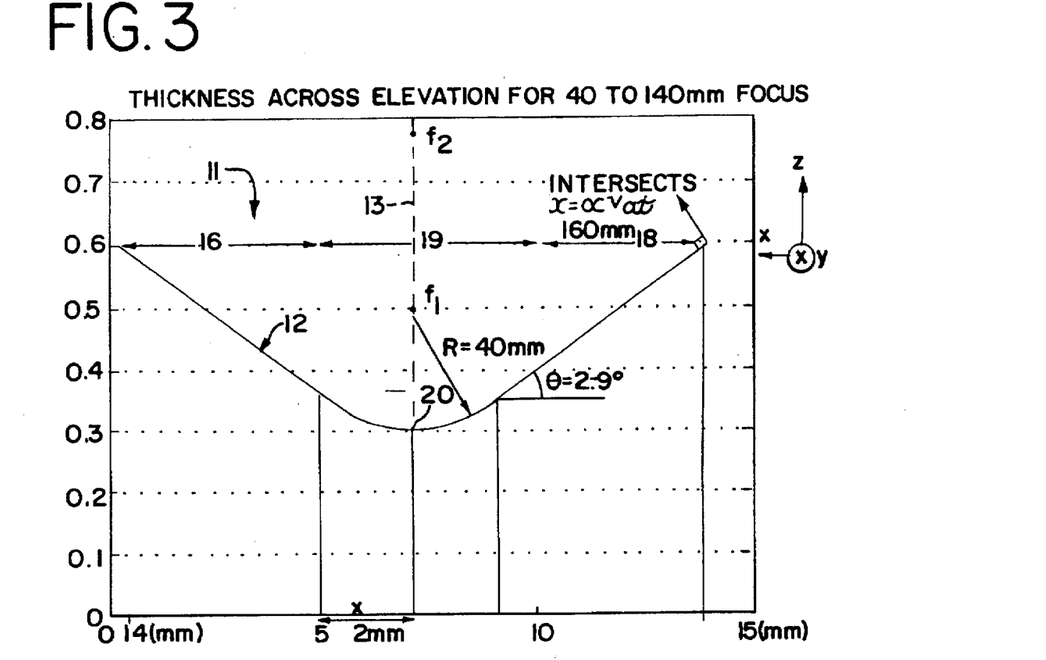
FIG. 3 is a cross-sectional profile of a transducer element according to a first preferred embodiment of the present invention.

FIG. 3 is a graph illustrating the cross-sectional profile of a transducer element according to a first preferred embodiment of the present invention. The elevation direction is along the horizontal axis and the range direction is along the vertical axis. The units of division along both axes are in millimeters. Transducer element 11 has a front portion 12, a back portion 14, a center portion 19, and two side portions 16 and 18. The front portion 12 is the surface which is positioned to face the region of examination. The back portion 14 may be shaped as desired, but is generally a planar surface.

Preferably the profile or surface geometry of the front portion 12 of the transducer element is a negatively "curved" surface with the thickness of the element 11 being greater at its side portions 16 and 18 than at its center portion 19. The thickness of the element 11 is defined along the range axis.

The front portion 12 of the transducer element 11 has a surface geometry that allows different frequencies of an ultrasound beam to be focused at different focal points. The focal point is defined by the intersection of a line perpendicular to the active surface of the transducer element and the axis 13 of the transducer. The surface geometry of the transducer element 11 shown in FIG. 3 has a center portion 19 defined by a circular arc and side portions 16 and 18 defined by straight segments. If only the center portion 19 of the transducer element is excited or active, the ultrasound beam will be focused at a single focal point $f_1$. When the side portions 16 and 18 of the transducer element are excited the ultrasound beam will be focused at a multitude of points along a line from focal point $f_1$ to focal point $f_2$ with the lowest frequency signals being focused at focal point $f_2$. This results because transducer resonant frequency is inversely proportional to its thickness. All frequencies transmitted are present but those closest to the resonant frequency are present to a dominant extent.

Thus when the center portion 19 of the element 11 is active, it predominantly emits high frequency ultrasound beam which is focused at focal point $f_1$. Because the side portion surface geometry of the transducer element are defined by straight lines and increase in thickness, the focal point varies along a line from focal point $f_1$ to focal point $f_2$ with the lowest frequency signal generated predominantly by the thickest part of the transducer element focused at focal point $f_2$. The focal points $f_1$ and $f_2$ are merely illustrative and are not drawn to scale. With this design, different frequency components within a single wideband excitation signal are focused at different points.

In this preferred embodiment the transducer element 11 is formed of piezoelectric material and has a width in the elevation direction of about 14 mm. The design of the transducer element allows the high frequency components of the excitation beam predominantly generated by the center portion 20 of the transducer element 11 to be focused at a focal point $f_1$ from the center 20 of the transducer element 11 and the lower frequency components of the excitation beam to be focused along a line from focal point $f_1$ to focal point $f_2$ with focal point $f_2$ from the center 20 of the transducer element 11.

The straight segments make an angle $\theta$ with the elevation axis defined by the following equation:

$$\mathrm{Tan}\,(\theta) = \frac{w}{2 \cdot f_2},$$

where w is the width of the transducer element in the elevation direction and $f_2$ is the distant focal dimension from the center 20 of the transducer element. With a width of 14 mm and a distant focal point of 140 mm, $\theta$ equals 2.9°. It is desirable to provide a smooth match between the straight segments and the center circular arc. An equation was derived using the equation for a circle and finding for what distance x from the center 20 of the element 11 the slope of the circular arc matches that of the straight segments. Using a small angle approximation, the distance x is determined by the following equation:

$$x = \frac{f_1 \cdot w}{2 \cdot f_2},$$

where $f_1$ is the focal point closest to the center 20 of the transducer element. In the presently preferred embodiment the transition from the center circular arc to the straight segments is about 2 mm from the center 20 of the transducer element 11 as shown.

Figure 4:
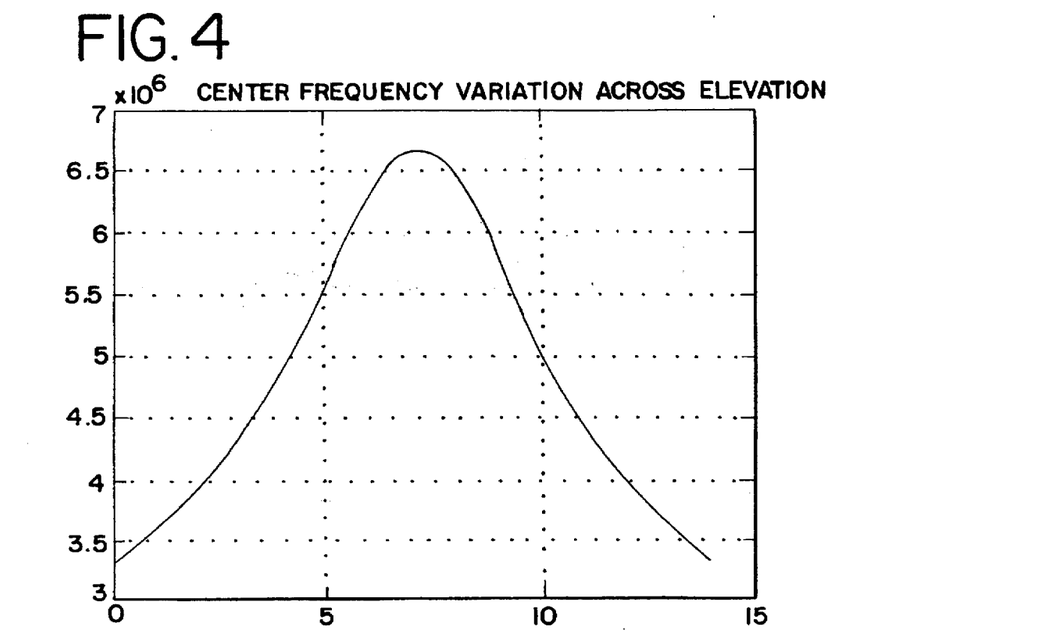
FIG. 4 is a graph of the frequency profile of the transducer element shown in FIG. 3.

FIG. 4 is a graph of the frequency profile of the transducer element shown in FIG. 3. The elevation direction is along the horizontal axis in millimeters and frequency is along the vertical axis in Hertz. In this preferred embodiment the minimum thickness of the transducer element is preferably about 0.3 mm which allows an output signal having a high frequency of about 7 MHz to be generated. The thickest portion of the transducer element 11 is about 0.6 mm which allows an output signal of about 3.5 MHz to be generated. As previously explained the center of the transducer element generates a narrow aperture beam of high frequency while lower frequency beams are generated by the full aperture of the transducer element. When using low frequency, although the end portions are closer to a resonant condition and hence will tend to exhibit the greatest pressure output for a low frequency excitation, the center region is thinner and consequently has a lower electrical impedance. This low electrical impedance permits more current to flow in this region and hence permits the pressure output to be almost as high in the center region as at the end regions. Hence, the pressure distribution across the array is not double peaked which would cause problems in the beam shape.

For comparison purposes the cross-sectional profile and graph of frequency versus elevation for a fixed or single focus transducer element such as that described in either U.S. Pat. Nos. 5,415,175 or 5,438,998, are shown respectively in FIGS. 5 and 6. The transducer element shown in FIG. 5 has an elevation profile or surface geometry defined solely by a circular arc. Unlike the transducer shown in FIG. 3, which can focus at multiple points, the transducer element of FIG. 5 will only focus at one point (not shown) which is about 90 mm from the center of the transducer element.

Therefore, by controlling the surface geometry of the transducer element, one can effectively control the focal points of different frequency components of the radiated energy. In addition, because the signal in the center of the transducer is stronger than at the ends or sides, correct apodization occurs. This is due to the fact that the electric field between the electrodes on the front portion and bottom portion is greatest at the center of the transducer element, reducing side lobe generation.

Further, because the transducer array constructed in accordance with the present invention is capable of operating at a broad range of frequencies, the transducer is capable of receiving signals possessing center frequencies other than the transmitted center frequency.

As was previously mentioned in a preferred embodiment the receive beamformer preferably includes a dynamic receive focusing system that allows the focus of the receive beamformer to be changed at a high rate in order to follow as accurately as possible the range along the ultrasonic scan line corresponding to the currently arriving signals.

Preferably, the receive beamformer includes a time-varying adjustable bandpass filter which is adjusted in real time to emphasize the frequency of the currently arriving signals. U.S. Pat. No. 4,016,750 describes a simple analog implementation for such a time-varying filter. A high-pass filter can be substituted for a bandpass filter. The body acts as a low-pass filter, and for this reason a high-pass filter may be sufficient to achieve the desired effect.

A time-varying bandpass filter slides from a maximum frequency to a minimum frequency. For the transducer element shown in FIG. 3 which has a maximum frequency of about 7 MHz and a minimum frequency of about 3.5 MHz it is preferable to have a time-varying filter that is centered at 7 MHz at a time $2 \cdot f_1/c$ and at 3 MHz at a time $2 \cdot f_2/c$ where c is the speed of sound in the body which is approximately 1.54 mm/microsecond. Thus the center frequency of the time-varying filter varies progressively from 7 MHz at 2·40/c to 3 MHz at 2·140/c. If the echo is originating from closer than the near focus then the center frequency of the filter is 7 MHz. If the echo is from between 40 mm to 140 mm then linear interpolation is used to determine the center frequency (i.e. 7 MHz at 40 mm to 3 MHz at 140 mm). If the signal is from beyond 140 mm then the center frequency is 3 MHz. The location of where the echo is from is determined by multiplying the speed of sound divided by two by the time of arrival of the echo. For example if the time of arrival of the echo is 53 μsec, the location from which it was generated is 40 mm from the center of the transducer element. The slide rate function need not be uniform with respect to time. The optimum bandwidth and filter characteristics of the time varying filter can best be determined from experience and by using design tools. A narrow bandwidth will give higher focusing accuracy but relative poor axial (range) resolution due to ring down. The frequency downshift related to natural body attenuation should be taken into account in the design of such a filter.

Heterodyne time-varying filters may also be used in the receive beamformer 13. Analog ultrasound systems frequently use a heterodyne technique to shift radio frequency pulses generated by the transducer down to an intermediate frequency, e.g. 1–3 MHz. See for example U.S. Pat. Nos. 4,140,022; and 5,218,869. If a narrow bandpass filter is employed on an intermediate frequency signal of 2 MHz, a time-varying bandpass filter will be formed which only passes components corresponding to the original components of 7 MHz down to 3 MHz as the local oscillator is varied from 9 MHz to 5 MHz. A time-varying local oscillator may be realized by using a voltage controlled oscillator circuit, where the voltage determining the desired local oscillator frequency is derived via a digital-to-analog converter from a value supplied by the system computer controller. A time-varying, sinusoidal-frequency waveform may also be generated using any one of a number of digital synthesizer techniques. See W. F. Egan, "Frequency Synthesis by Phase Lock", Krieger, 1990.

Digital filtering can also be used in the receive beamformer. A digitized signal may be shifted using quadrature sampling and sample decimation. Fine shifts in frequency are achieved by means of complex multiplication with an appropriate complex exponential $\exp(j*2*\pi*t*f_0)$, where $f_0$ is the amount of shift in frequency. The amount of frequency downshifting can be varied as a function of time and therefore range. Varying the degree of frequency shifting of the signal with respect to a fixed-frequency bandpass filter results in a time-varying portion of the original signal spectrum being passed. A fixed finite impulse response (FIR) bandpass or low-pass filter is applied to the data to yield a net response equivalent to a time-varying filter.

It is anticipated that the transmit beamformer described in Hossack, et al. U.S. patent application Ser. No. 08/397,833 filed Mar. 2, 1995 and incorporated herein by reference and assigned to the assignee of the present invention can be adapted for use with this invention.

It is anticipated that the receive beamformer described in U.S. patent application Ser. No. 08/432,615, filed May 2, 1995 entitled "Method and Apparatus for Receive Beamformer System," and specifically incorporated herein by reference and assigned to the assignee of the present invention can be adapted for use with this invention.

Figure 5:
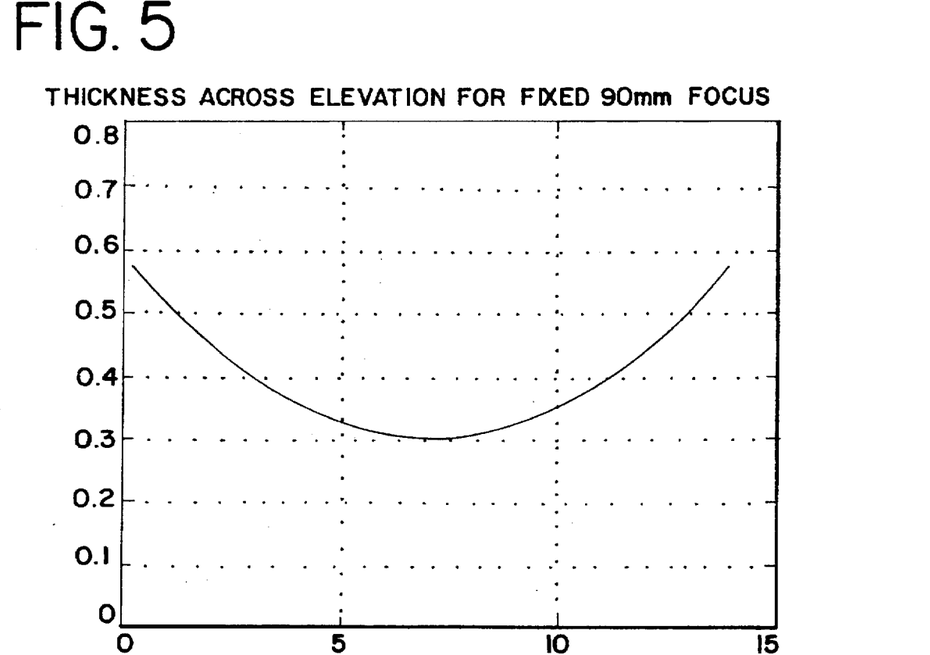
FIG. 5 is a cross-sectional profile of a transducer element according to the prior art.
Figure 6:
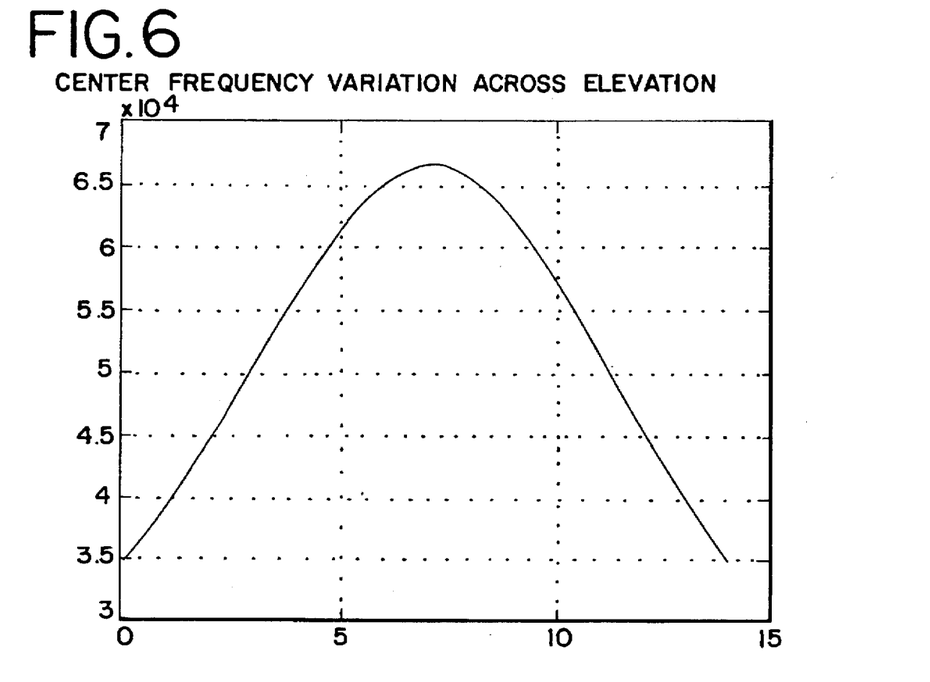
FIG. 6 in a graph of the frequency profile of the transducer element shown in FIG. 5.
Figure 7:
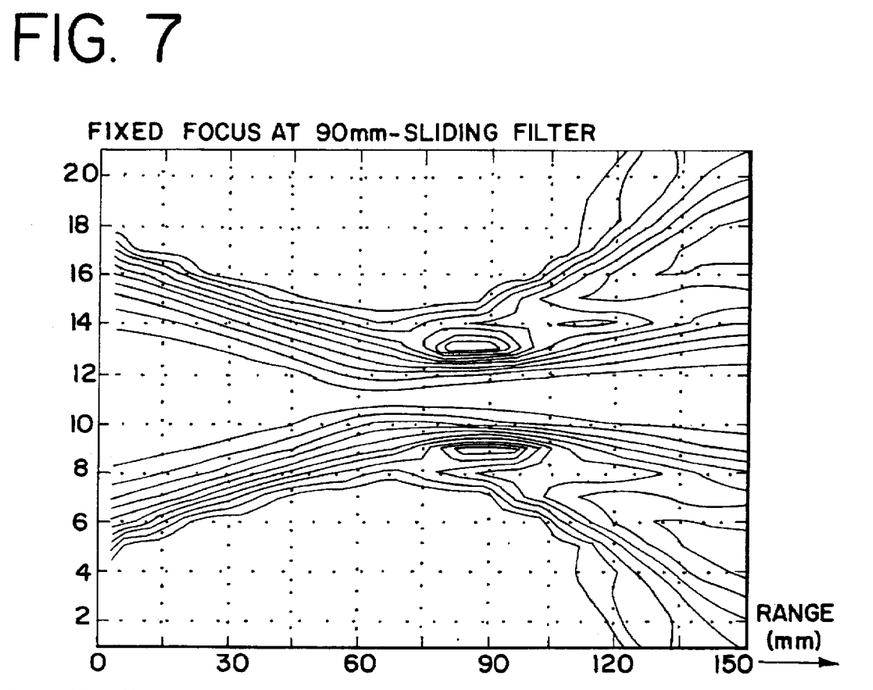
FIG. 7 in a contour plot of the beam width versus range for a fixed focus transducer such as that shown in FIG. 5 used in conjunction with a time varying filter.
Figure 8:
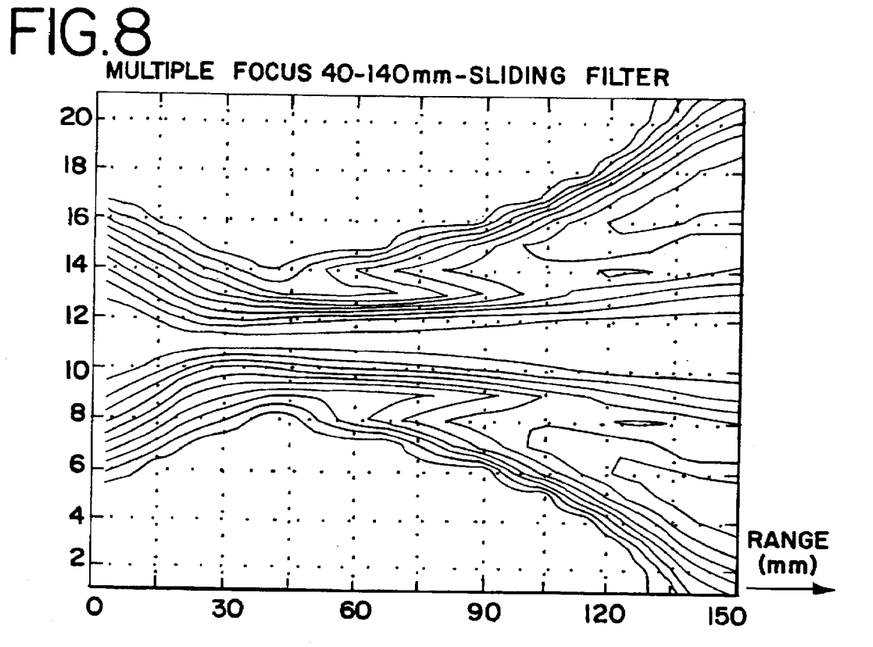
FIG. 8 is a contour plot of the beam width versus range for a multiple focus transducer such as that shown in FIG. 3 used in conjunction with a time varying filter.

FIG. 7 is a 2 dB contour plot of the beam width versus range for a fixed focus transducer such as that shown in FIG. 5 used in conjunction with a time varying filter. FIG. 8 is a 2 dB contour plot of the beam width versus range for a multiple focus transducer such as that shown in FIG. 3 used in conjunction with a time varying filter. In both contour plots the range is along the horizontal axis in millimeters and the beam width is along the vertical axis in millimeters. While the fixed focus transducer performs better in the vicinity of 90 mm and beyond, it can be seen that it is inferior in the near field.

Figure 9:
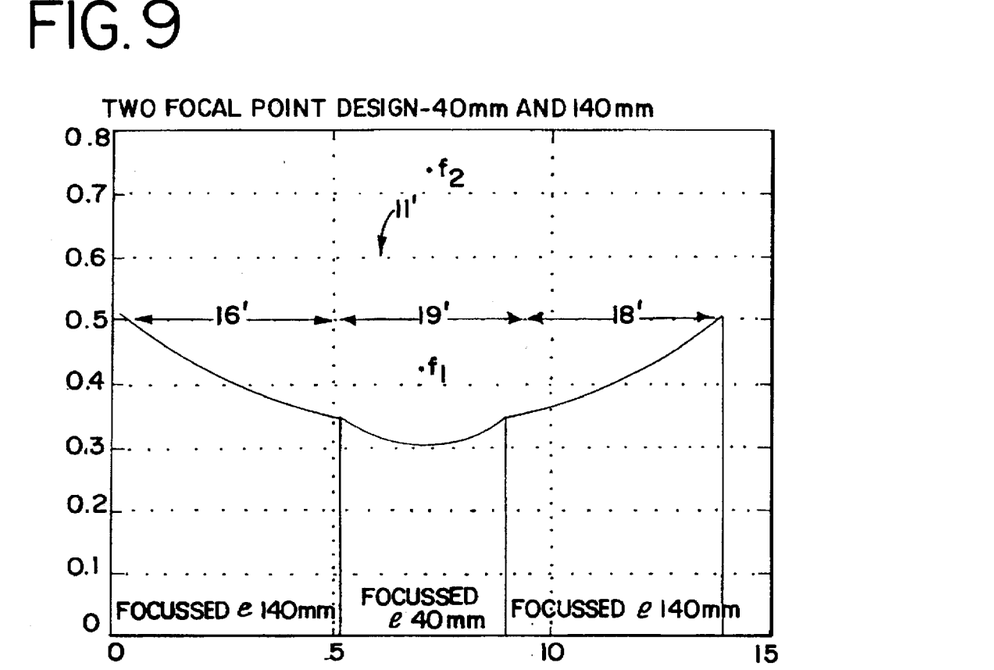
FIG. 9 is a cross-sectional profile of a transducer element according to a second preferred embodiment of the present invention.

The transducer element may have other surface geometries than that shown in FIG. 3 and still achieve multiple focuses. FIG. 9 is a cross-sectional profile of a transducer element according to a second preferred embodiment of the present invention. The axes represent the same dimensions as was shown in FIG. 3. The elevation profile or surface geometry of the transducer element 11' has a center portion 19' again formed by a circular arc that focuses the beam at a focal point $f_1$ close to the surface of the element. The side portions 16' and 18' are defined by a circular arc that has a different radius from that of the center portion 19' that focuses the beam at a second focal point $f_2$ in the far field. Unlike the transducer element of FIG. 3, the surface geometry of the transducer element 11' only allows focusing at two discrete focal points instead of a range of focal points.

Figure 10:
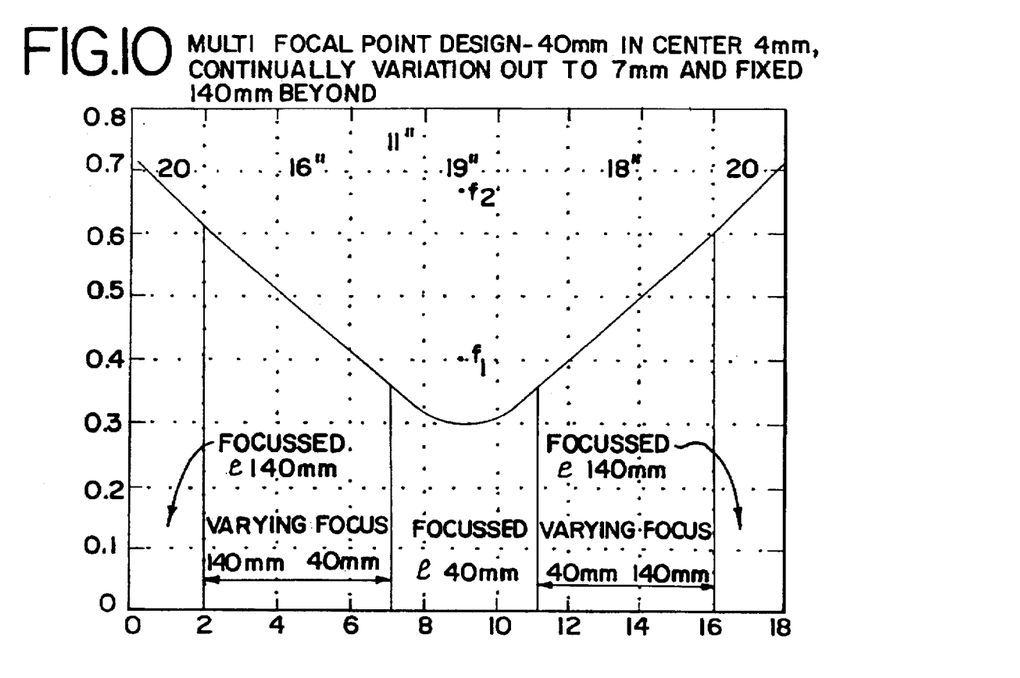
FIG. 10 is a cross-sectional profile of a transducer element according to a third preferred embodiment of the present invention.

FIG. 10 is a cross-sectional profile of a transducer element 11" according to a third preferred embodiment of the present invention. The transducer element shown in FIG. 10 combines features of both the transducer elements shown in FIGS. 3 and 9. The center portion 19" is defined by a circular arc which focuses the high frequency beams at a focal point $f_1$ close to the surface of the element. Like the transducer element shown in FIG. 3 the side portions 16" and 18" connected to the center portion 19" are straight segments that allow varying focusing from focal point $f_1$ to focal point $f_2$. The remainder of the side portions 20 are defined by a circular arc having a different radius than that which defines the center portion 19" and allows the lowest frequency signals to be focused at a focal point $f_2$.

Other variations exist. For example, the surface geometry of the transducer element may be elliptical resulting in two discrete focal points.

The transducer elements may be fabricated according to the methods described in U.S. Pat. Nos. 5,415,175 and 5,438,998.

In alternate embodiments the matching layer may have a thickness that follows a similar pattern to that of the piezoelectric element, i.e. it has a non-uniform thickness. If such a matching layer or layers are used, the focusing of the beam will be modified by the lens effect in the matching layer or layers and in the acoustic layer and window layer. The position of the actual focus may be determined using standard ray propagation techniques as is well known by those of ordinary skill in the art. One comprehensive method is to use the Fermat Shortest Path Law to determine the paths of sound waves emanating from particular points within the piezoelectric material. The design may be changed in an iterative manner until the focus characteristic which is desired is achieved.

Figure 11:
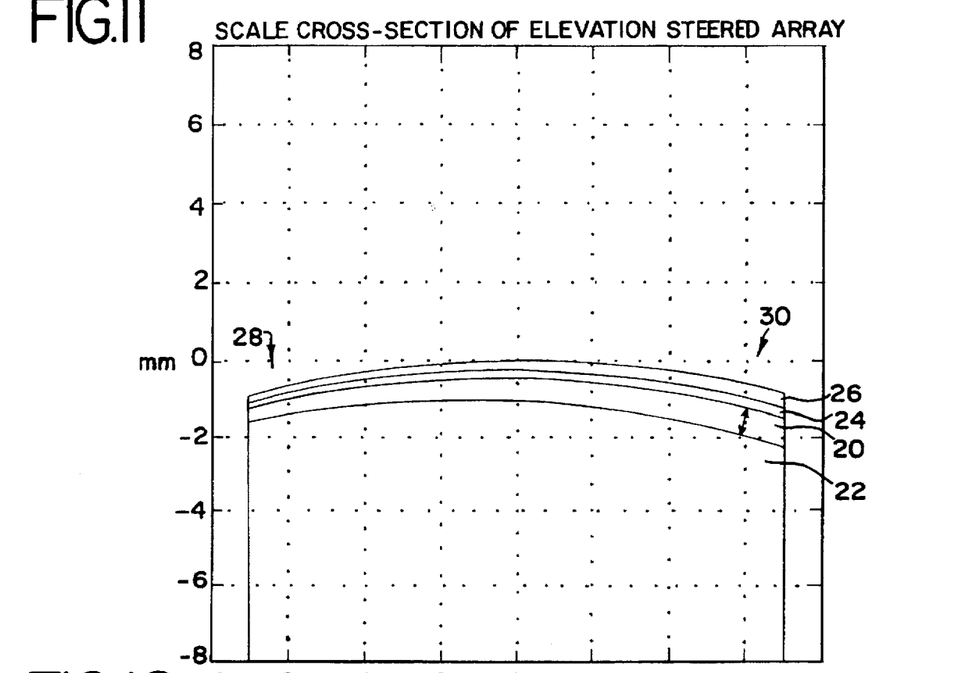
FIG. 11 is a cross-sectional profile drawn to scale of a transducer element according to a fourth preferred embodiment of the present invention.

FIG. 11 is a cross-sectional profile drawn to scale a transducer element according to a fourth preferred embodiment of the present invention. The transducer element 20 is disposed on a backing block 22 and two acoustic matching layers 24 and 26 are disposed on the transducers element 20. Preferably, acoustic matching layer 24 is a high impedance layer preferably formed of Dow Corning's epoxy DER 332 plus Dow Corning's curing agent DEH 24 plus a filler of 1 micron tungsten carbide and 9 micron alumina particles which are added to obtain an acoustic impedance of approximately 10.0 MRayls and acoustic matching layer 26 is a low impedance matching layer preferably formed of Dow Corning's epoxy DER 332 plus Dow Corning's curing agent DEH 24.

As can be seen from the profile, the array has a nonuniform thickness extending along the elevation direction so that the array is thin at end 28 and thick at the opposite end 30. While the array is shown convex in shape, it may alternatively be concave.

When the transducer is operated using a relatively low frequency with wide bandwidth a divergent beam is produced. In a preferred embodiment the radius of acoustic matching layer 26 is about 28 mm resulting in a divergent emitted ultrasound beam of about 30° wide. The dimensions of the array may be varied to obtain the maximum divergent angle desired for a particular application.

Figure 12:
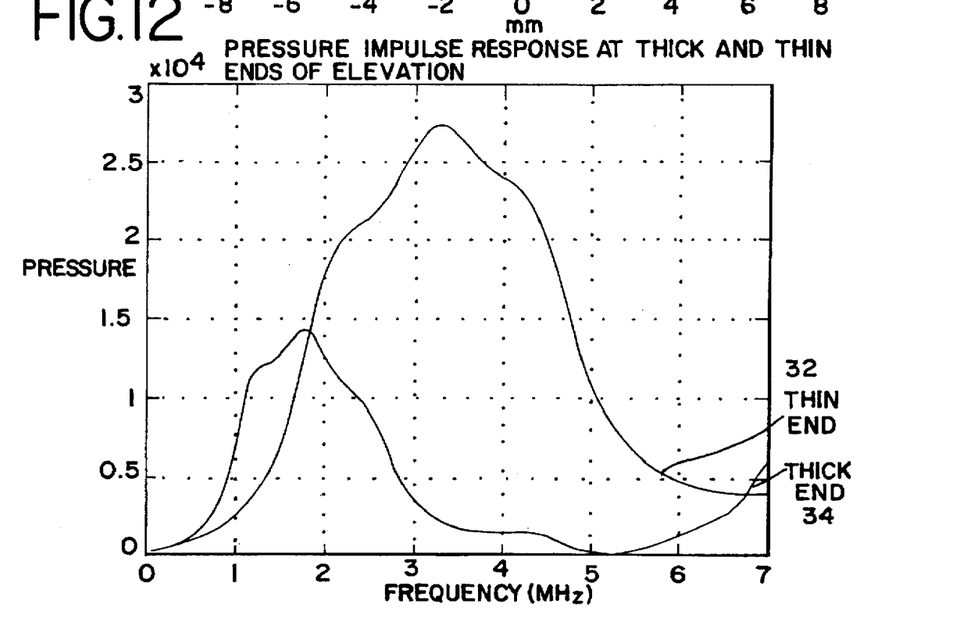
FIGS. 12–14 are graphs of the pressure impulse responses at the thick and thin ends of the transducer array shown in FIG. 11.
Figure 13:
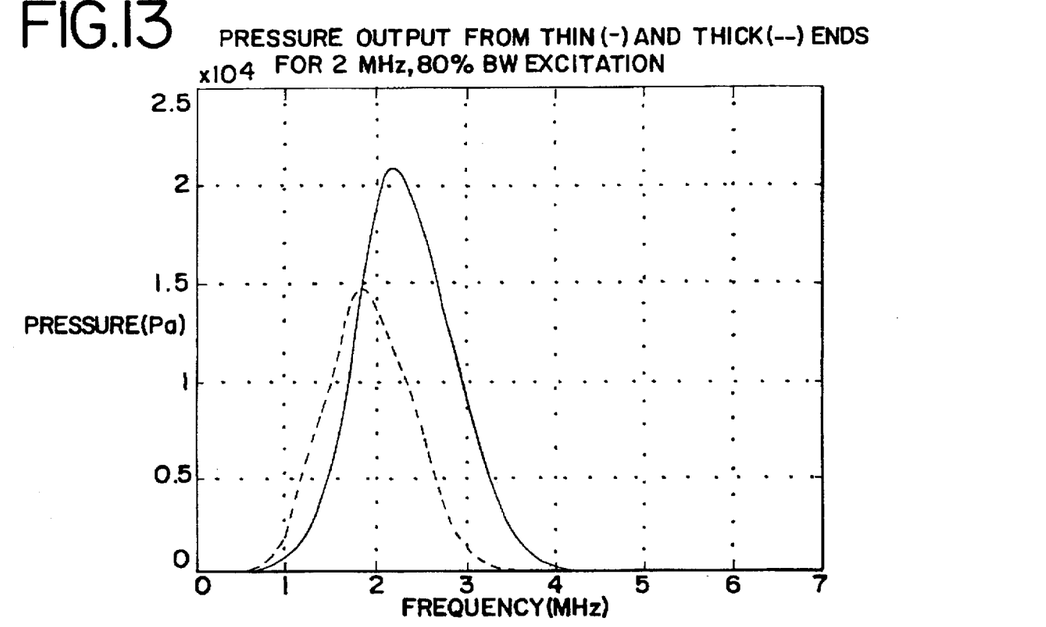
Figure 14:
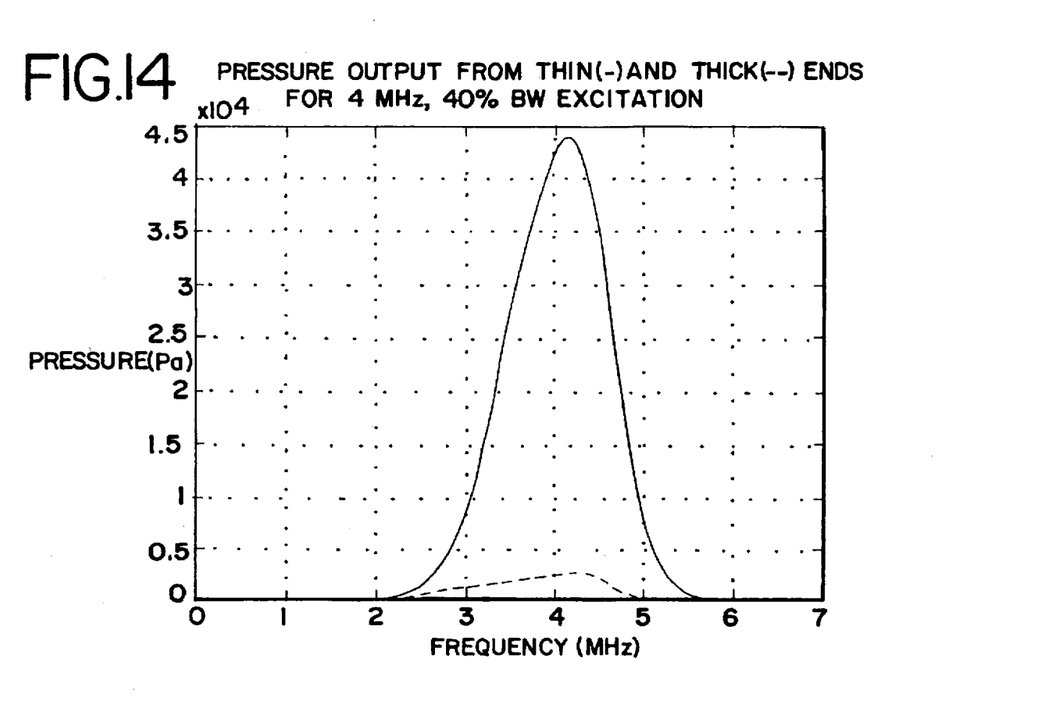

FIGS. 12–14 are graphs of the pressure impulse responses at the thick and thin ends of the transducer array shown in FIG. 11. Frequency in MegaHertz is along the horizontal axis and pressure in Pascals is along the vertical axis. The thin portion of the array has a larger pressure impulse response as shown by graph 32 than the thicker portion of the array as shown by graph 34 in FIG. 12. The array is capable of operating at about 4 MHz in the thin portion and about 2 Mz in the thick portion.

By driving the array with either high or low frequency components of controlled bandwidth and preferably possessing Gaussian envelopes, portions of the array may be selectively activated. When the transducer array is operated with a 2 MHz signal possessing a relatively wide bandwidth (80% –6 dB fractional bandwidth) a relatively uniform distribution of sensitivity across the array as shown in FIG. 13 is obtained. However, if the array is driven with a 4 MHz signal possessing a relatively narrow bandwidth (40% –6 dB fractional bandwidth), as shown in FIG. 14, then only the thinner end is active. Since the thinner end of the array is "pointing" to one side, the beam also tends to point to one side. Hence, by controlling the frequency of the excitation and/or bandwidth, or the receive bandpass filter, or any combinations of these, it is possible to control to some extent the direction and width of beam in the elevation beam.

Figure 15:
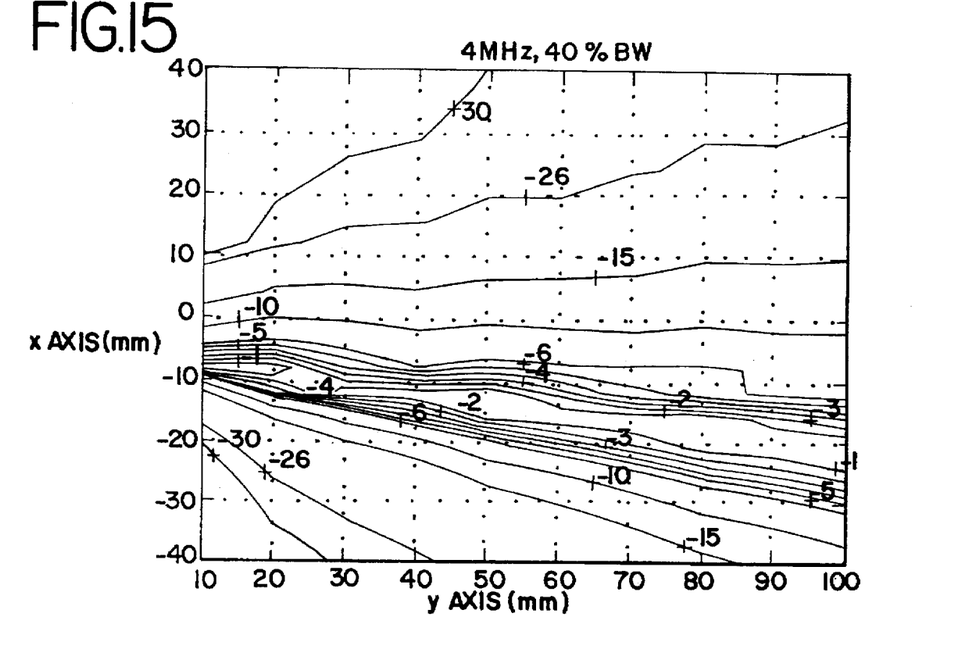
FIG. 15 is a contour plot of the beam width versus range for the transducer shown in FIG. 11 excited at 4 MHz.
Figure 16:
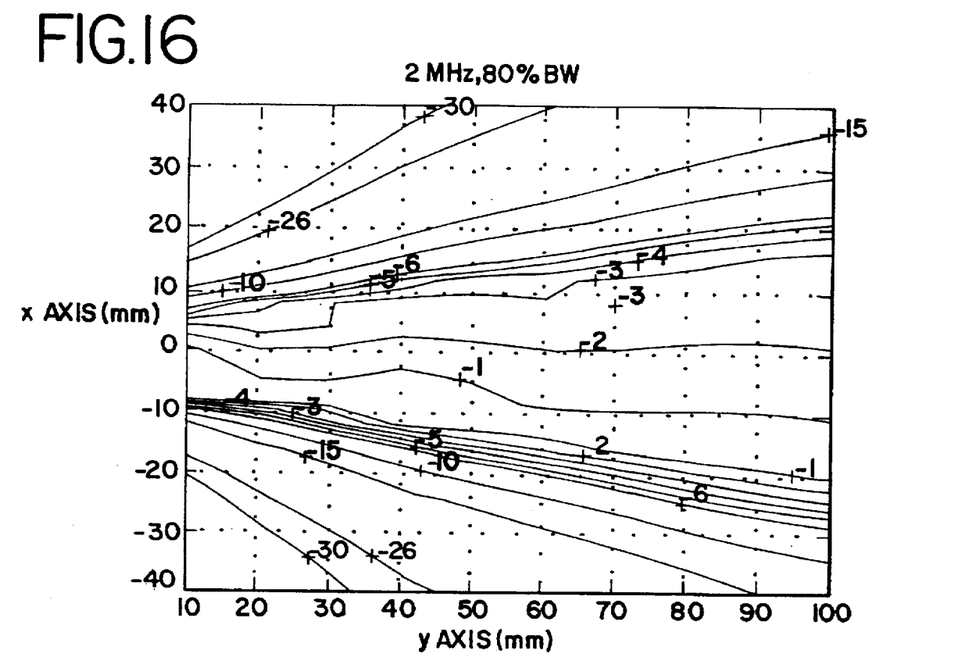
FIG. 16 is a contour plot of the beam width versus range for the transducer shown in FIG. 11 excited at 2 MHz.

FIG. 15 is a contour plot of the beam width versus range for the transducer shown in FIG. 11 excited at 4 MHz. In a preferred embodiment the excitation pulse is generally Gaussian in shape and centered at 4 MHz. The bandwidth of the pulse is 40% of the center frequency measured at points –6 dB with respect to the peak amplitude. Such a pulse will be referred to herein as a 40% BW Gaussian pulse. As can be seen, the beam is steered off axis by approximately 11 degrees. FIG. 16 is a contour plot of the beamwidth versus range for the transducer shown in FIG. 11 excited at 2 MHz with an 80% bandwidth Gaussian pulse.

The elevation controlled beam may be used advantageously in a number of ways. First a wideband beam can be transmitted with different components separately filtered out and associated with different beam directions. The returned beams may be reconstructed in a three dimensional format. The filtering upon receipt may be simultaneous, i.e., using duplicate receive hardware for the separately filtered components, or it can be sequential by transmitting successive pulses and using different filtering on these successive pulses. If the sequential method is used, the advantage of potentially controlling the transmit frequency response may result.

In addition, the three dimensional data may be color coded so that high frequency components, i.e., near one end of the beam, appear in a different color from low frequency components. Also, during three dimensional reconstruction, a degree of intelligence can be applied to the data depending on where in the beam it is from. If it is desired to have a view looking from the high frequency side to the low frequency side and the image plane is filled with data from the high frequency frame, then it is not necessary to incorporate data from the lower frequency frames which appear behind the high frequency data. If no high frequency data is present at a particular point in the frame, low frequency data is included since it is not hidden. In the process of reconstructing a three dimensional image in an intelligent manner, one can use color or intensity to highlight whether the data is high frequency, i.e. near the surface, or low frequency, i.e. away from the surface. It is preferable to make the high frequency components and associated elevation plane correspond to the top surface so that detail resolution data is maximized. Lower frequency and lower resolution appear behind the top surface. This differs from systems that employ simple integration techniques since they cannot distinguish hidden objects from surface objects.

This method could also be adapted to correct for tissue related frequency downshift. As high frequency signal components return from progressively deeper portions, their center frequency will tend to downshift. Such a downshift may be accounted for in the filtering process.

The present invention may also be used in combination with pulses exhibiting a time varying center frequency, i.e., "chirp" signals. If a chirp signal is employed a receiver filter with a non-linear phase versus frequency characteristic is used so that the frequency components are made to align in time and thereby result in a more compact signal during image reconstruction. Such filters are well known and may be either analog or digital. Employing a chirp signal provides several benefits. First, a chirp signal has lower peak power for the same total energy. Also, by varying the length of the chirp signal, a degree of defocusing in the elevation can be achieved since in the case of a transducer having the geometry shown in FIGS. 3 and 5, if high frequencies are advanced in time and low frequencies are delayed in time, relative to one another, the net result is a defocusing effect. As described in U.S. Pat. No. 5,305,756 this defocusing effect would result in a pseudo 3D image.

A programmable transmit beamformer such as that described in U.S. Ser. No. 08/432,056 filed May 2, 1995 and U.S. Ser. No. 08/397,833 filed Mar. 2, 1995, both of which are hereby incorporated by reference could be used to produce a chirp signal.

It is to be understood that the forms of the invention described herewith are to be taken as preferred examples and that various changes in the shape, size and arrangement of parts may be resorted to, without departing from the spirit of the invention or scope of the claims.

What is claimed is:

1. A transducer array for producing an ultrasound beam upon excitation, the transducer array comprising:
a plurality of transducer elements, each of the transducer elements having a non-planar surface facing a region of examination wherein each of the transducer elements has a shape that focuses different frequency components at different focal points.

2. A transducer array according to claim 1 wherein the transducer elements are formed of piezoelectric material.

3. A transducer array according to claim 1 wherein each of the transducer elements has a thickness at at least a first point on the surface facing the region of examination being less than a thickness at at least a second point on the surface.

4. A transducer array according to claim 1 wherein each of the transducer elements has a center portion defined along an elevation direction and side portions defined along the elevation direction on opposite sides of the center portion wherein the center portion has a shape different from the side portions.

5. A transducer array according to claim 4 wherein the center portion has a first radius of curvature and the side portions have a second radius of curvature, the first radius of curvature being different from the second radius of curvature.

6. A transducer array according to claim 4 wherein the center portion and side portions define an ellipse.

7. A transducer array according to claim 4 wherein the side portions are formed by straight lines and the center portion is formed by a circle.

8. A transducer array according to claim 7 wherein the side portions form an angle $\theta$ with a horizontal axis where $\theta$ is defined by the equation $$\theta = \tan^{-1}\left(\frac{w}{(2)(f_2)}\right),$$

where w is the width of the transducer element in the elevation direction and $f_2$ equals the distance of the furthest focal point from the surface of the transducer element.

9. A transducer array according to claim 7 wherein the side portions begin a distance X from the center of the curved portion where X is defined by the equation $$x = \frac{(f_1)(w)}{(2)(f_2)},$$

where $f_1$ equals the distance of the closest focal point from the surface of the transducer element and $f_2$ equals the distance of the furthest focal point from the surface of the transducer element.

10. A transducer array according to claim 1 further comprising at least one acoustic matching layer disposed on the surface facing the region of examination of each transducer element.

11. A transducer array according to claim 1 wherein each of the transducer elements has a shape that can focus different frequency components at two discrete focal points.

12. A transducer array according to claim 1 wherein each of the transducer elements has a shape that can focus different frequency components at more than two focal points.

13. A transducer array according to claim 1 wherein the transducer element has a shape that can focus a beam along a line of focal points.

14. A transducer array according to claim 13 wherein the line of focal points is perpendicular to an elevation axis.

15. An ultrasound transducer array comprising:
a plurality of transducer elements, each transducer element having a front surface facing a region of examination, a back surface, two side portions and a thickness between the front portion and the back portion wherein the thickness is greater at each of the side portions than between the side portions, the front surface being generally non-planar wherein each of the transducer elements produce an ultrasound beam that is focused at a first focal point when a first frequency is used to excite the transducer elements and wherein each of the transducer elements produce an ultrasound beam that is focused at a second focal point when a second frequency is used to excite the transducer elements, wherein the second focal point is different from the first focal point.

16. An ultrasound transducer array according to claim 15 wherein the first frequency is greater than the second frequency and the first focal point is closer to the front surface of the transducer element than the second focal point.

17. An ultrasound transducer array according to claim 15 further comprising an acoustic matching layer or layers disposed on the front surface of each transducer element.

18. An ultrasound system for generating an image, the system comprising:

transmit circuitry for transmitting electrical signals to a transducer probe;

a transducer probe for transmitting an ultrasound beam produced by a given frequency excitation and for receiving pressure waves reflected from a body being examined; and receive circuitry for processing the signals received by the transducer probe, the transducer probe comprising a plurality of transducer elements, each of the transducer elements having a non-planar surface facing a region of examination wherein each of the transducer elements has a shape that can focus different frequency components at more than one focal point.

19. An ultrasound system according to claim 18 further comprising a time-varying filter coupled to the receive circuitry, wherein the time-varying filter varies its passband characteristics to receive different frequency signals.

20. An ultrasound system for generating an image comprising:

transmit circuitry for transmitting electrical signals to a transducer probe;

a transducer probe for transmitting an ultrasound beam produced by a given frequency excitation and for receiving pressure waves reflected from a body being examined; and receive circuitry for processing the signals received by the transducer probe, the transducer probe comprising a plurality of transducer elements, each transducer element having a front surface facing a region of examination, a back surface, two side portions and a thickness between the front portion and the back portion wherein the thickness is greater at each of the side portions than between the side portions, the front surface being generally non-planar wherein each of the transducer elements produces an ultrasound beam that is focused at a first focal point when a first frequency is used to excite the transducer elements and wherein each of the transducer elements produce an ultrasound beam that is focused at a second focal point when a second frequency is used to excite the transducer elements wherein the second focal point is different from the first focal point.

21. An ultrasound system according to claim 20 further comprising a time-varying filter coupled to the receive circuitry wherein the time-varying filter varies its passband characteristics to receive different frequency signals.

22. An ultrasound system according to claim 20 wherein the transmit circuitry transmits an excitation signal having a Gaussian spectrum.

23. An ultrasound system according to claim 20 wherein the transmit circuitry transmits an excitation signal having a center frequency which varies rapidly with time.

24. An ultrasound system according to claim 20 further comprising an acoustic matching layer disposed on the front surface of each of the transducer elements.

25. A method of making a transducer for producing an ultrasound beam upon excitation, the method comprising the steps of:

forming a plurality of transducer elements, each of the transducer elements comprising a front surface facing a region of examination, a back surface, two side portions and a thickness between the front portion and the back portion wherein the thickness is greater at each of the side portions than between the side portions, the front surface being generally non-planar wherein each of the transducer elements produces an ultrasound beam that is focused at a first focal point when a first frequency is used to excite the transducer elements and wherein each of the transducer elements produce an ultrasound beam that is focused at a second focal point when a second frequency is used to excite the transducer elements wherein the second focal point is different from the first focal point; and establishing an electric field through at least one portion of each transducer element.

26. A method according to claim 25 further comprising the step of disposing an acoustic matching layer on the surface of each transducer element.

27. A method of making a transducer for producing an ultrasound beam upon excitation, the method comprising the steps of:

forming a plurality of transducer elements, each of the transducer elements comprising a non-planar surface facing a region of examination wherein each of the transducer elements has a shape that focuses different frequency components at at least one of a plurality of focal points; and establishing an electric field through at least one portion of each transducer element.

28. A method according to claim 27 further comprising the step of disposing an acoustic matching layer on the surface of each transducer element.

29. A method for producing an image in response to excitation of a transducer for generating an ultrasound beam, the method comprising the steps of:

providing electrical signals to a transducer probe for transmitting a beam of ultrasound pressure waves to an object being examined such that the transducer probe includes a plurality of transducer elements, each of the transducer elements comprising a non-planar surface facing a region of examination wherein each of the transducer elements has a shape that focuses different frequency components at more than one focal point;

receiving pressure waves reflected from the object being examined and converting the received pressure waves into electrical signals;

processing the received electrical signals; and displaying the object being examined.

30. A method according to claim 25 further comprising the step of filtering the received pressure waves using a time-varying filter.

31. A transducer array for producing an ultrasound beam upon stimulation with excitation pulses, the transducer array comprising:

a plurality of transducer elements, each of the transducer elements having a thickness that varies in the elevation direction from a first end of the transducer element to the second end of the transducer element wherein the transducer element is thinnest at the first end and thickest at the second end.

32. An ultrasound system according to claim 31 wherein a relatively wideband pulse is employed to obtain a wide beam in the elevation direction.

33. An ultrasound system according to claim 31 wherein the frequency and bandwidth of the excitation pulse are varied so as to selectively steer a beam in the elevation direction.

* * * * *